Figure 1:
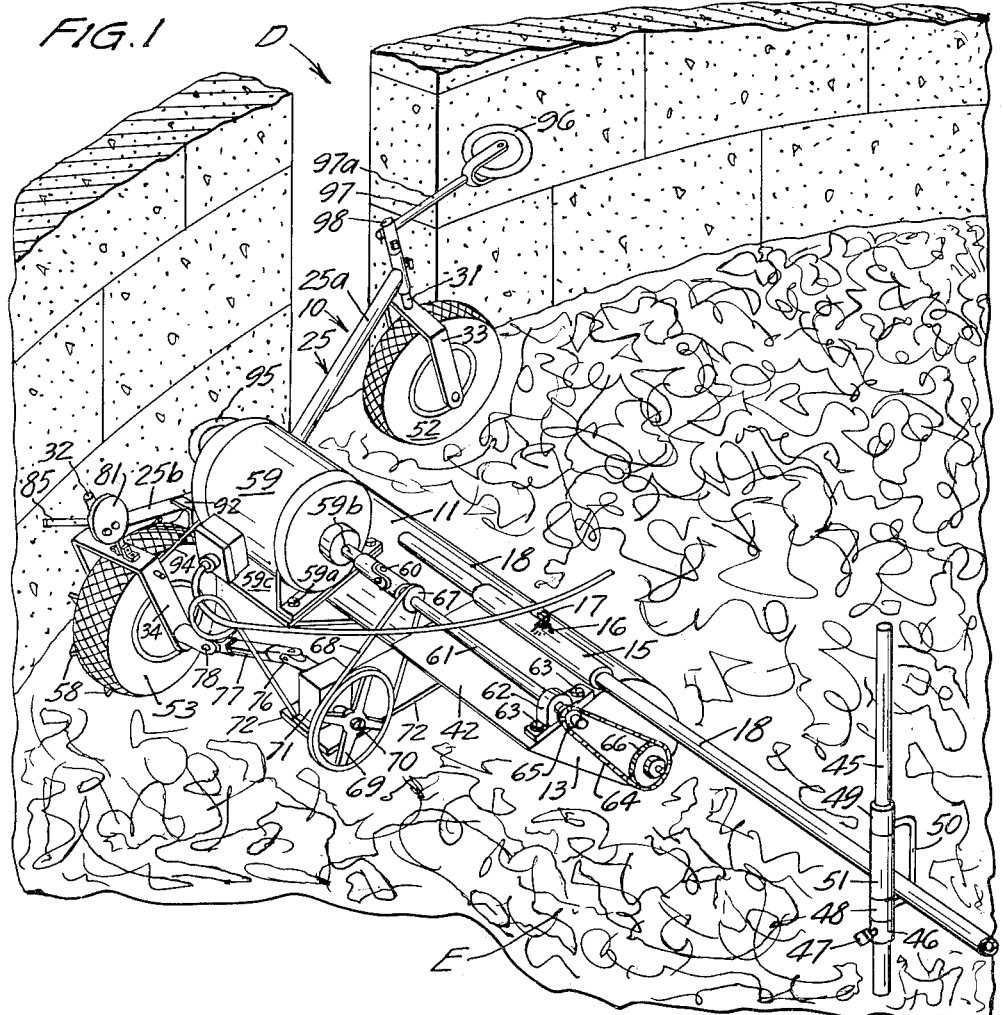

Jan. 16, 1962   J. SOEHL ET AL   3,017,045
SILAGE CUTTING AND COLLECTING APPARATUS
Filed June 26, 1958   3 Sheets-Sheet 1

INVENTORS
JOHN SOEHL
WARREN C. HOFFMAN
BY Williamson Schroeder & Palmatier
ATTORNEYS Jan. 16, 1962     J. SOEHL ET AL     3,017,045
SILAGE CUTTING AND COLLECTING APPARATUS
Filed June 26, 1958     3 Sheets-Sheet 2
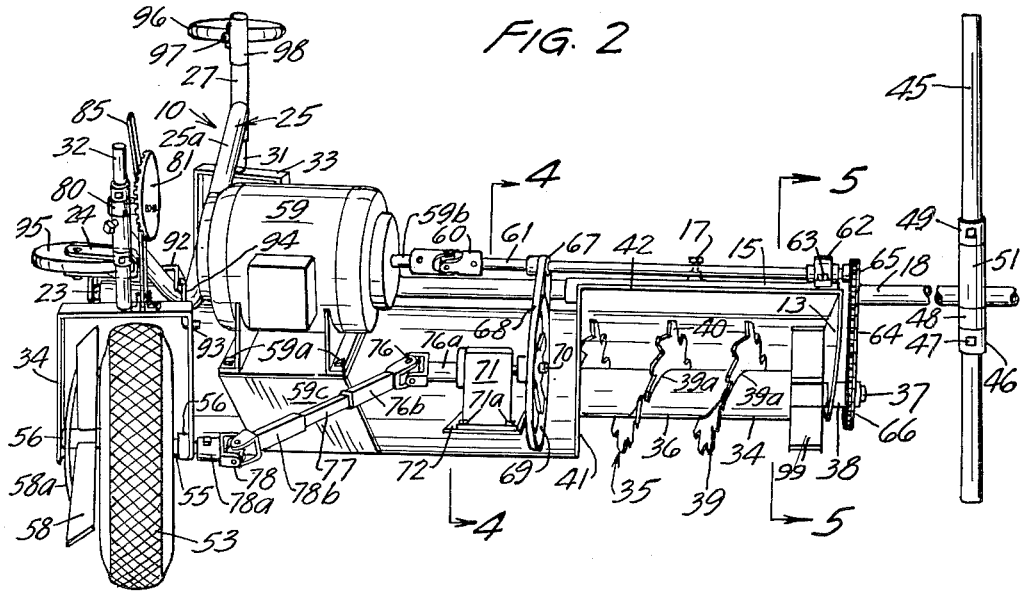
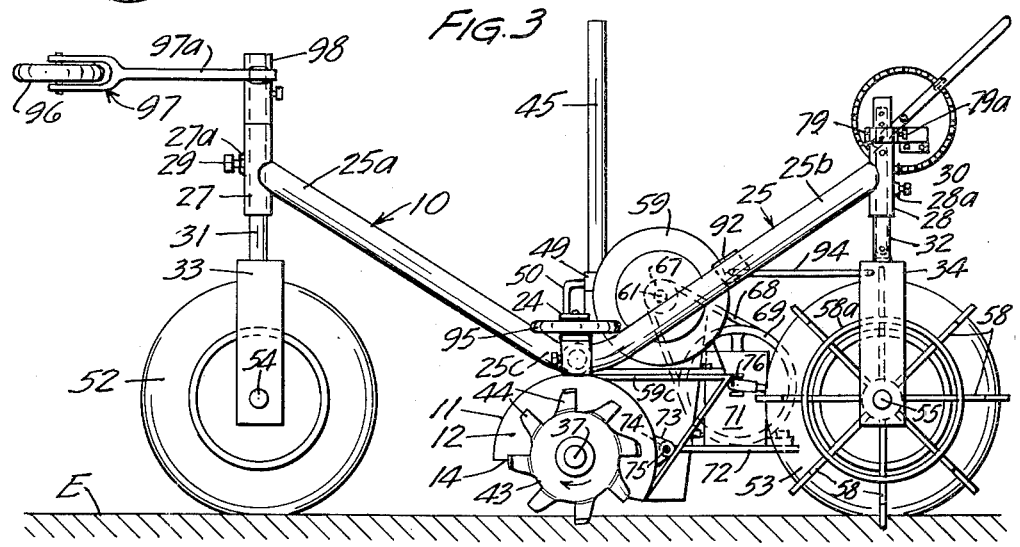
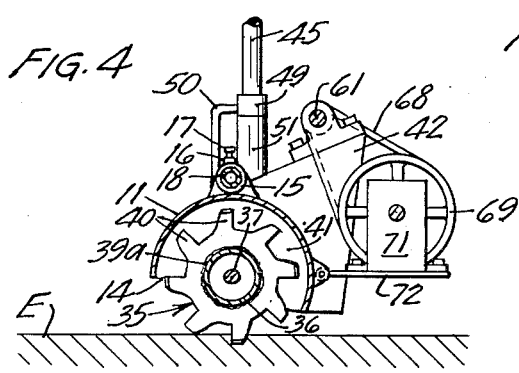
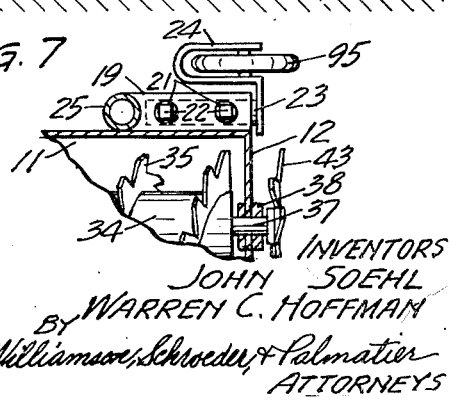
INVENTORS
JOHN SOEHL
WARREN C. HOFFMAN
BY Williamson, Schroeder, & Palmatier
ATTORNEYS

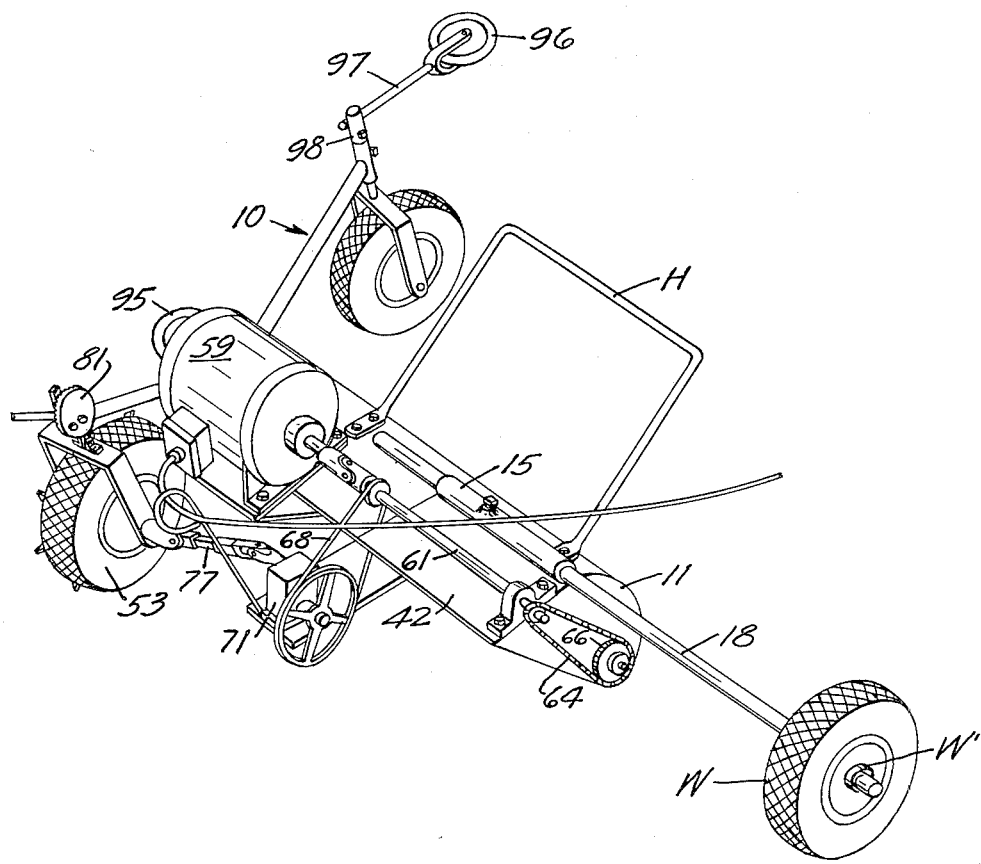

United States Patent Office 3,017,045
Patented Jan. 16, 1962

3,017,045
SILAGE CUTTING AND COLLECTING
APPARATUS
John Soehl and Warren C. Huffman, Winthrop, Minn.
Filed June 26, 1958, Ser. No. 744,706
2 Claims. (Cl. 214—17)

This invention relates to apparatus for handling silage in a silo and more specifically relates to apparatus for cutting and loosening compacted and frozen silage in a silo.

An object of our invention is the provision of a new and improved apparatus of relatively simple and inexpensive construction and operation for cutting and loosening the silage in a silo whereby to permit ready and easy handling of the silage.

Another object of our invention is to provide a novel power-driven apparatus for cutting and loosening silage in a silo without any need for manually controlling or guiding the apparatus.

A further object of our invention is the provision of an improved and novel apparatus which travels around the inner periphery of a silo wall and on top of the silage in the silo for loosening the silage and causing the loosened silage to be collected in a circular windrow at the center of the silo where the silage may be easily forked into a basket or may be removed from the silo in any other convenient means.

A still further object of our invention is to provide a new and novel apparatus for traveling around the inner periphery of a silo for cutting and loosening the silage and particularly loosening the silage from the wall of the silo to which the silage may be frozen.

A still further object of my invention is to provide a new and improved silage cutter and loosening apparatus which may be used in silos of any of a number of sizes whereby to travel around the inner periphery and loosen the silage therein, and may also be used to loosen silage which is compacted or frozen to various degrees of hardness.

Figure 5:
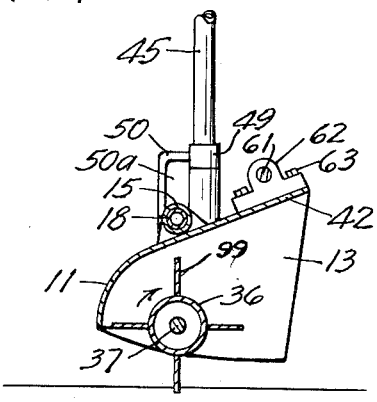
Figure 6:
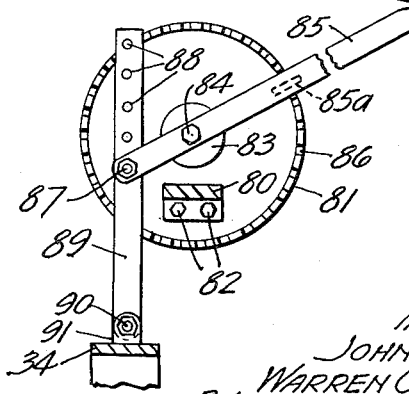

These and other objects and advantages of my invention will more fully appear from the following description made in connection with the accompanying drawings wherein like reference characters refer to the same or similar parts throughout the several views and in which:

FIG. 1 is a perspective view of the invention;
FIG. 2 is a perspective view of the invention, viewed from a different angle;
FIG. 3 is an end elevation view of the invention;
FIG. 4 is a detail transverse section view taken substantially at 4—4 in FIG. 2;
FIG. 5 is a detail section taken substantially at 5—5 in FIG. 2;
FIG. 6 is an enlarged detail view of a portion of the mechanism;
FIG. 7 is an enlarged detail view, partly in section, showing the mounting of one of the wall-engaging guide wheels; and
FIG. 8 is a perspective view showing a modified form of the invention.

One form of the present invention is shown in the accompanying figures and is described herein. The invention includes a supporting structure which may be indicated in general by the numeral 10. The supporting structure includes, an elongate, rigid, and generally cylindrical auger housing 11 which has its ends closed by means of end plates 12 and 13. Housing 11 has an enlarged opening 14 which extends throughout the length thereof at the bottom side. The supporting structure 10 also includes a rigid sleeve 15 affixed as by welding on the inner end portion of the housing 11, and has an internally threaded boss 16 integral therewith which carries a set screw 17 for clamping against a rigid elongated element 18 which is telescopically received in the sleeve 15 and is adjustable longitudinally by loosening the set screw 17.

The supporting structure 10 also includes a rigid sleeve 19 affixed as by welding at 20 to the outer end portion of the auger housing 11. The sleeve 19 also has a pair of internally threaded bosses 21 formed integrally therewith which carry set screws 22 for securely clamping the shank 23 of the bifurcated guide roller mounting 24 in a horizontal position.

The supporting structure 10 also includes an elongated, rigid, V-shaped frame element 25 which extends transversely of the auger housing 11 and lies in a vertical plane with the fore-and-aft end portions 25a and 25b sloping upwardly and outwardly from the housing 11. The V-shaped frame element 25 is affixed at its apex portion 25c as by welding 26 to the inner end of sleeve 19 and to the outer housing 11. Shank-receiving sleeves 27 and 28 are affixed as by welding to the front and rear ends of the frame element 25. The sleeves 27 and 28 are vertically oriented, and are provided with internally threaded bosses 27a and 28a and set screws 29 and 30 in the bosses to receive and clamp the vertical shank or shaft portions 31 and 32 of the bifurcated wheel mountings 33 and 34.

The invention is provided with silage-engaging means for loosening and cutting and conveying the silage E in the silo. In the form shown, such means include an auger conveyor which is indicated in general by numeral 35 and which includes a drum-shaped core 36 which is affixed to shaft 37 which is journalled in suitable bearing 38 mounted on the end plates 12 and 13 of the auger housing 11. The auger 35 has a helix or helically shaped blade 39 affixed as by welding 39a to the outer periphery of the drum 36 and extending helically throughout the entire length thereof. The helical blade 39 has a plurality of teeth 40 formed in the outer edge thereof. It will be noted that the teeth 40 project outwardly into proximity with the interior of housing 11 and the edge portions of the several convolutions of helical blade 39, or the teeth 40, project downwardly outwardly of the opening 14 in the auger housing 11.

The housing 11 is also provided with a silage discharging opening 41, at the rear side thereof and adjacent the inner end portion thereof. A generally rectangular, but open bottomed hood 42 surrounds the opening 41 to direct the silage discharged therethrough in a rearward direction.

Such silage cutting and loosening means also include a rotary blade 43 which is affixed as by a set screw to the outer end of shaft 37 and exterior of the end plate 12 of the auger housing 11. The blade 43 has a plurality of teeth 44 which revolve in vertical planes in close proximity with the silo wall for cutting and loosening silage frozen or otherwise stuck thereto. It will be noted that the teeth 44 are provided with a set, that is, adjacent teeth 44 are bent in opposite directions with respect to each other out of the plane of the blade 43.

Means are connected with the inner end portion of the supporting structure for retaining said inner end portion adjacent the center of the silo. In the form shown, such means includes an anchoring device or post 45 which may be formed of rigid pipe and which is to be driven downwardly into the top surface of the silage, approximately at the center of the silo. A collar 46 is affixed on the post 45 as by a set screw 47 and is adapted to be shifted along the post 45 as the level of the silage in the silo is changed. Means are provided for rotatably connecting the rigid element 18 with the post 45 in such a manner as to permit rotation of the element 18 around the post, but restrict any transverse movement of the element 18, and to also permit longitudinal sliding of the element 18 with respect to post 45. In the form shown, such means includes a bearing-forming sleeve 48 which is concentric of the pipe 45 in engagement with the collar 46, and a second rotary bearing-forming sleeve 49 which is rotatably mounted on the post 45 and a rigid, U-shaped interconnecting element 50 which is affixed as by welding at its opposite ends to the sleeves 48 and 49. A sleeve-type roller 51 is also rotatably mounted on the post 45 between the sleeves 48 and 49 to carry the element 18 thereagainst. Element 18 is adapted to extend through the opening 50a which is defined by the U-shaped element 50. Element 18 is free to slide through the opening 50a and to revolve around the post 45, but is restricted from moving in a transverse direction. It will therefore be seen that the inner end portion of the supporting structure will remain adjacent the central portion of the silo.

Rotary supporting means are provided for moving the auger around the periphery of the silo, and in the form shown, such means include a pair of rubber-tired supporting wheels 52 and 53 which are respectively mounted in fore-and-aft relation with respect to the direction of movement of the auger and auger housing around the silo and which are respectively carried by the wheel mountings 33 and 34. Wheel 52 is mounted on a shaft 54 which extends between the depending leg portions of the bifurcated wheel mounting 33. Wheel 53 is keyed to a rotary shaft 55 which is journalled in suitable bearings 56 at the lower ends of the depending legs of wheel-mounting 34.

Another silage-engaging device is carried on the shaft 55 within the wheel-mounting 34 and includes a plurality of radially extending rigid bars 57 welded to a central mounting which is secured in driving relation to the shaft 55. The outer end portions of each of the bars 57 are interconnected with each other by means of an annular rod 58a which is welded to each of the bars 57.

A source of rotary power comprising electric motor 59 is affixed as by bolts 59a to a rigid bracket 59c which is mounted on the outer housing 11. The drive spindle 59b of motor 59 is connected by means of a universal joint 60 to a rotary shaft 61, the outer end of which is journalled in a bearing 62 which is adjustably connected on the top of the hood 42 by bolts 63 so as to facilitate moving of the bearing 62 to tighten a drive chain 64 which is trained around sprockets 65 and 66 which are respectively keyed on the ends of shaft 61 and the inner end of shaft 37. A belt-driving pulley 67 is affixed on the shaft 61 and is connected by means of belt 68 to a large speed-reducing pulley 69, which is carried on the spindle 70 of a speed reducing gearing mechanism 71. Mechanism 71 is affixed on a mounting plate 72 as by bolts 71a, and the mounting plate 72 is hingedly or swingably connected to the auger housing 11. A pair of apertured ears 73 are affixed as by welding to the auger housing 11 and a tubular element 74 is affixed as by welding to the inner end of plate 72 to receive a bolt 75 therethrough and through the apertured ears 73 for hingedly connecting the mounting plate 72 onto the auger housing 11. It will be seen that the weight of the speed reducing gearing mechanism 71 urges the pulley 69 downwardly so as to maintain tension on the drive belt 68. A mounting plate 72 may be swung upwardly as by manual means so as to loosen the belt 68 and prevent the transmission of rotary power to the mechanism 71.

The slow speed power output spindle of the speed-reducing gearing mechanism 71 is connected to one end 76a of a universal joint 76, the other end 76b of which comprises an elongated, squared, sleeve, to slidably receive a square shaft 77 therein. The other end of shaft 77 is slidably received in an elongated, squared end portion 78b of a universal joint 78 and the other end 78a of the universal joint 78 is securely clamped onto the rotary shaft 55 which drives the wheel 53.

Means are provided for vertically adjusting the position of wheel 53 for raising and lowering the auger 35 with respect to the silage over which it passes. In the form shown, such means includes a collar 79 affixed as by set screws 79a to the sleeve 28 and having an outwardly projection bracket portion 80 formed integrally thereof. A rigid disc 81 is affixed to the bracket portion 80 by means of bolts 82. The disc 81 has a pivot mounting boss 83 formed integrally thereof at the center for receiving a pivot bolt 84 which mounts a yieldable handle 85 thereon for rotation about the pivot bolt 84. Handle 85 has a lug 85a on one side thereof to engage and fit into the teeth 86 on the peripheral edge portion of the disc 81. The other end of handle 85 has lug-forming bolt 87 fitted thereinto and projecting through one of the apertures 88 of an elongated bar 89, the lower end of which is swingably mounted on a pivot bolt 90 which is projecting through the apertured ears 91 welded to the wheel mounting 34. When the wheel 53 is to be adjusted only slightly, the handle 85 is sprung slightly so as to remove the lug 85a from the notch between teeth 86. The handle will then be swung in one direction or another to raise or lower the wheel mounting 34. In order to make a substantially permanent and rather large adjustment of the vertical position of wheel mount 34, the bolt 87 is loosened and the handle 85 is connected to the bar 89 at a different aperture 88.

Means are also provided for maintaining the wheel 53 at the proper orientation with respect to the supporting structure and in the form shown, an apertured web 92 is affixed as by welding in an upright position on the side of leg member 25b of frame element 25. An aperture 93 is also provided in one of the legs of the wheel mounting 34 and a rigid rod 94 is secured in the aperture 93 and in the aperture of the plate 92 for holding the wheel 53 in the desired orientation.

Means are provided for maintaining the apparatus in predetermined relation with respect to the silo wall, and more specifically for maintaining a proper relation between the rotary-toothed blade 43 and the silo wall. In the form shown, such means includes a roller or wheel 95 which is journalled in a bifurcated mounting 24 on a vertical axis.

A second guide roller or wheel 96 is journalled for rotation about a vertical axis on a wheel mounting 97 which has an elongated shank portion 97a, the end of which is carried in a bracket 98 on the upper end of the shank portion 31 of wheel mounting 33. It will be noted that the roller 96 is disposed substantially forwardly from the roller 95 and is spaced therefrom a distance at least equal to the width of a door D in the silo wall so as to provide continuous guiding for the mechanism as the rollers 95 and 96 alternately engage the silo wall on opposite sides of the door D as the machine travels around the periphery of the silo.

When the machine is prepared for use in a particular silo, the wheels 52 and 53 are oriented with their rotation axes substantially in radial relation with respect to the silo side wall. The wheels 52 and 53 may be oriented to roll slightly toward the silo sidewall so as to continuously maintain the guilding rollers 95 and 96 in engagement with the silo side wall. Ordinarily, after the orientation of the wheels 52 and 53 has been set, this will not be adjusted again for the particular silo in which the apparatus is to be used. However, it should be noted that by loosening the set screws 29 and 30, the wheels 52 and 53 may be reoriented to adapt the apparatus for use in another differently sized silo. It should be noted that a different rod 94 of different length is preferably inserted so as to hold the wheel mounting 34 in the proper position.

When the apparatus is set up for use, the post 45 will be driven into the silage adjacent the center of the silo. Obviously it is preferable that the post 45 be positioned as close as possible toward the center of the silo, but the positioning of this post need not be precisely exact. The rigid element 18 of the supporting structure will then be inserted through the opening 50a defined by the element 50 so as to restrict the inner end portion of the supporting structure from moving and also for supporting the inner end portion of the structure at a predetermined elevation with respect to the top of the silage.

When power is applied to the motor 59, the shaft 61 is revolved at high speed to transmit high speed rotary motion to the auger so as to rotate the auger in the direction of arrow A. Of course, simultaneously, power is transmitted through the belt drive to the speed reducing gearing mechanism and thence to the driving wheel 53. It has been found, that with the use of a ten inch wheel for the wheel 53, a speed of 3 r.p.m. is satisfactory so as to produce the desired movement of the apparatus around the silo wall. As the mechanism progresses in a forward direction around the periphery of the silo wall, the toothed auger 35 is rapidly revolved so as to cut and loosen a quantity of silage from the material which is compacted or frozen in the silo. Simultaneously, the rotary toothed blade 43 is rapidly revolving in close proximity with the silo wall so as to cut away and discharge in a forward direction, because of its rotation in the direction of arrow A, any silage which may be stuck as by freezing to the silo sidewall. The material is thrown forwardly from the blade 43 and is immediately picked up by the auger 35. It will be noted that as the silage is cut and loosened by the auger, the loosened silage is substantially simultaneously moved along the auger inwardly toward the inner end portion of the auger housing 11 and the loosened silage is then rapidly discharged through the opening 41 and through the hood 42. The loosened silage which is discharged from the hood 42 is formed into a generally circular windrow adjacent the central portion of the silo so that the loosened silage may be easily manually handled or otherwise discharged from the silo. As the silage progressively moves along with the auger toward the inner end of the auger housing, the silage ultimately is engaged by the rotary paddles 99 at the inner end of the auger drum so that all of the silage is positively driven from the housing 11.

It will be noted that as the machine progressively travels around the silo wall, the rollers 95 and 96 are engaged with the sidewall so as to maintain the proper relation between the rotary toothed blade 43 and the silo sidewall. When the machine approaches a door D in the silo sidewall, the rollers 96 will first pass over the opening and will then engage the wall at the opposite side of the door. Subsequently the roller 95 will pass over the door D, but as this is being accomplished, the roller 96 is holding the machine in proper relation with respect to the silo wall.

When, in cold weather, it is desired to stop the silage loosener and cutter, the power should first be stopped to the drive wheel 53. In order to accomplish this, the plate 72 will be swung upwardly slightly so as to relieve the tension on belt 68, whereby no rotary power will be transmitted to the pulley 69 and the wheel 53 will stop. Power continues to be applied to the auger 35 and the material engaged by the auger will be loosened and cut and conveyed toward the inner end of the housing 11 and discharged therefrom. Within a few seconds, the entire housing 11 will be clear of any silage and then the power to the motor may be removed so as to stop the auger as well as the drive wheel. The housing will thereby be entirely free and clear of any silage which may cause sticking of the auger during the next operation if it should freeze or otherwise deteriorate any of the parts in the housing.

In the form of the invention shown in FIG. 8 it is substantially identical with the form of the invention shown in FIGS. 1–4 with the exception of the means for supporting the inner end of the rigid frame element 18, and also with the exception that this form of the invention incorporates a handle H affixed as by bolts to the housing 11 and projecting rearwardly and upwardly from the housing.

In this form of the invention, a supporting wheel W is mounted on the inner end of frame element 18 and may be retained thereon as by the collars W'. By adjusting the frame element 18 in the rigid sleeve 15, the position of wheel W may be changed. In the use of the invention as shown in FIG. 8, the silage in any portion of the silo may be loosened by steering the device at the handle H, which may be mounted rearwardly of the machine with reference to the direction of travel or, on the alternative may be positioned in front of the machine.

It will be seen that we have provided a new and improved silage loosening and cutting mechanism for travel around on top of the silage in a silo without necessitating any manual control of the mechanism and in such a manner that the silage is cut clear of the silo sidewall and is piled in a readily accessible location adjacent the central portion of the silo.

It will, of course, be understood that various changes may be made in the form, detail, arrangement and proportion of the parts without departing from the scope of my invention which consists of the matter described herein and set forth in the appended claims.

What is claimed is:

1. Apparatus for use on top of the silage in a silo, comprising a supporting structure having an inner end portion adjacent the center of the silo and an outer end portion adjacent the silo wall, said supporting structure including an elongate and substantially horizontal, open-bottomed auger housing extending generally inwardly from the silo wall, means connected with the inner end portion of the supporting structure to retain the same adjacent the center of the silo, rotary support and driving means journalled on the outer end portion of the supporting structure and arranged for rolling on the silage in a forward direction around the silo wall, an auger conveyor in the auger housing and journalled on the supporting structure for rotation about an axis extending inwardly from the outer end portion of the structure, the blade edges of the auger projecting downwardly from the open bottom of the housing into engagement with the silage for moving the loose silage toward the center of the silo, the auger housing having a forwardly facing discharge opening adjacent the inner end thereof for depositing the loosened silage in a circular windrow adjacent the center of the silo, and means on the supporting structure for rotating the auger conveyor and the rotary support means, whereby the blade edges will loosen and collect silage and move the same from the periphery of the silo to the central portion thereof as the apparatus is moved around the silo.

2. Apparatus for loosening silage in a silo, comprising a supporting structure having an outer end portion in proximity with the silo wall and having an inner end portion in proximity with the center of the silo, means on the inner end portion of the supporting structure and anchored in the silage adjacent the center of the silage and preventing fore-and-aft swinging of the inner end portion of the supporting structure, but permitting movement of the supporting structure substantially radially of the silo, silage-moving means mounted on the supporting structure and engaging the silage therebelow, a pair of spaced, fore-and-aft rotary support elements journalled on the supporting structure for rotation about axes extending substantially radially of the silo, a source of power on the supporting structure and drivably connected with the movable silage-moving elements and also with one of the rotary support elements for driving the same, a pair of silo wall-engaging guide rollers journaled on the outer end portion of the supporting structure for rotation about upright axes spaced from each other a distance at least equal to the width of a door in the silo wall, whereby the guide rollers alternately engage portions of the silo wall on opposite sides of a door therein to cooperate with the means anchoring the inner end portion of the supporting structure to prevent swinging oscillation of the supporting structure and maintain the apparatus in predetermined relation with the silo wall.

References Cited in the file of this patent

UNITED STATES PATENTS

| | | |
|---|---|---|
| 2,601,431 | Christie | June 24, 1952 |
| 2,670,631 | Anderson | Mar. 2, 1954 |
| 2,719,058 | Van Dusen | Sept. 27, 1955 |
| 2,768,821 | Hedlund et al. | Oct. 30, 1956 |
| 2,788,247 | Chapman | Apr. 9, 1957 |
| 2,816,804 | Harrer | Dec. 17, 1957 |
| 2,858,033 | Hofer | Oct. 28, 1958 |